(12) United States Patent
An et al.

(10) Patent No.: US 9,720,177 B2
(45) Date of Patent: Aug. 1, 2017

(54) OPTICAL PHASE DIVERSITY RECEIVER FOR COHERENT OPTICAL COMMUNICATION USING PERIODIC AND IDENTICAL CHIRPED GRATING SURFACES

(71) Applicant: ELECTRONICS AND TELECOMMUNICATIONS RESEARCH INSTITUTE, Daejeon (KR)

(72) Inventors: Shin Mo An, Daejeon (KR); Oh Kee Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/170,626

(22) Filed: Jun. 1, 2016

(65) Prior Publication Data
US 2016/0377813 A1    Dec. 29, 2016

(30) Foreign Application Priority Data
Jun. 24, 2015    (KR) ........................ 10-2015-0089813

(51) Int. Cl.
G02B 6/293    (2006.01)
G02B 6/27    (2006.01)

(52) U.S. Cl.
CPC ......... *G02B 6/2931* (2013.01); *G02B 6/2706* (2013.01); *G02B 6/2938* (2013.01); *G02B 6/29307* (2013.01); *G02B 6/29308* (2013.01)

(58) Field of Classification Search
CPC ........ G02B 6/27; G02B 6/2706; G02B 6/293; G02B 6/29307; G02B 6/29308; G02B 6/2931; G02B 6/2938
See application file for complete search history.

(56) References Cited

U.S. PATENT DOCUMENTS 5,412,496 A    5/1995  Nakajima et al.
7,542,641 B1 *  6/2009  Asghari ............ G02B 6/12007
                                               385/24

(Continued)

OTHER PUBLICATIONS

Doerr et al., Polarization Diversity Waveguide Grating Receiver with Integrated Optical Preamplifiers, Jan. 1997.*

(Continued)

*Primary Examiner* — Andrew Jordan
(74) *Attorney, Agent, or Firm* — Rabin & Berdo, P.C.

(57) ABSTRACT

An optical phase diversity receiver may include: a diffraction grating including grating surfaces; a first input waveguide to which a first optical signal is inputted; a second input waveguide to which a second optical signal is inputted; and a slab waveguide including an input terminal optically coupled with the first and second input waveguides, and an output terminal provided at a position at which optical signals reflected by the diffraction grating reach the slab waveguide. Every determined number of grating surfaces are chirped in an identical manner. The slab waveguide is configured to guide the first and the second optical signals to the diffraction grating and guide the optical signals reflected by the diffraction grating to the output terminal. The grating surfaces are configured such that each of the optical signals reflected by the diffraction grating is divided into the predetermined number by optical power distribution.

15 Claims, 6 Drawing Sheets

(56) References Cited

U.S. PATENT DOCUMENTS

| | | | |
|---|---|---|---|
| 8,165,437 B2 | 4/2012 | Pyo et al. | |
| 8,463,088 B1* | 6/2013 | Asghari | B82Y 20/00 |
| | | | 359/333 |
| 8,463,093 B2* | 6/2013 | Feng | G02B 5/1861 |
| | | | 385/129 |
| 8,588,565 B2 | 11/2013 | Doerr | |
| 2007/0086703 A1* | 4/2007 | Kirk | G02B 6/12007 |
| | | | 385/37 |
| 2013/0136389 A1* | 5/2013 | Luo | G02B 6/12007 |
| | | | 385/11 |
| 2014/0086585 A1* | 3/2014 | Li | G02B 6/29308 |
| | | | 398/87 |
| 2016/0377813 A1* | 12/2016 | An | G02B 6/2931 |
| | | | 385/24 |

OTHER PUBLICATIONS

Takayuki Mizuno et al., "Ultra-Compact and Low-Loss Silica-Based Dual Polarization Optical Hybrid for Digital Coherent Receiver with Excellent Common-Mode Rejection Ratio", Optical Fiber Communication Conference and Exposition and the National Fiber Optic Engineers Conference (OFC/NFOEC), Mar. 17-21, 2013.

Mikitaka Itoh et al., "Heterogeneous integration of InP PDs on silica-based PLCs", Optical Fiber Communication Conference and Exposition and the National Fiber Optic Engineers Conference (OFC/NFOEC), Mar. 17-21, 2013.

Nobuhiro Kikuchi, "Optoelectronic components for higher order modulation formats", Optical Fiber Communication Conference and Exposition and the National Fiber Optic Engineers Conference (OFC/NFOEC), Mar. 17-21, 2013.

\* cited by examiner

OPTICAL PHASE DIVERSITY RECEIVER FOR COHERENT OPTICAL COMMUNICATION USING PERIODIC AND IDENTICAL CHIRPED GRATING SURFACES

CROSS-REFERENCE TO RELATED APPLICATION

The present application claims priority to Korean patent application number 10-2015-0089813 filed on Jun. 24, 2015, the entire disclosure of which is incorporated herein in its entirety by reference.

BACKGROUND

Field of Invention

Various embodiments of the present disclosure are directed to an optical phase diversity receiver, and more particularly, to an optical phase diversity receiver for coherent optical communication which separates, depending on polarization characteristics and a phase difference, light combined for optical communication.

Description of Related Art

With regard to the development of the optical communication technology, a high-speed information and communication device using coherent technology is developing from an OOK (on-off keying) direct amplitude modulation method of modulating the intensity of light to a phase shift keying (PSK)-phase modulation method of modulating the phase of an optical signal or a method of simultaneously modulating the phase and the light intensity.

The coherent optical communication uses a phase component of an optical signal in data processing and increases the capacity of data processing through phase modulation, polarization modulation, intensity modulation and wavelength division methods. With regard to the coherent optical communication technology, a receiver which receives polarization-combined/phase-modulated signals and separates polarized light and divides the phases into I and Q signals is called a phase diversity receiver.

The phase diversity receiver combines, to amplify a received optical signal, it with an internal optical signal, which is called a local oscillator signal, so as to increase the intensity of light, and thereafter separates only phase components and restores the signal. To separate the phase components, if from respective I and Q components, signals having 180° phase differences (0° and 180°, 90° and 270°) are converted into electrical signals by an optical detector, and the two signals are removed by a differential amplifier or the like, only phase component signals can be obtained.

That is, the phase diversity receiver performs 1) combination of a received optical signal and a local oscillator optical signal, 2) TE (transverse electric)/TM (transverse magnetic) polarization separation of the optical signal, 3) I and Q component separation of the optical signal, 4) I (0°), I-bar (180°), Q (90°) and Q-bar (270°) component separation of the optical signal, 5) conversion of the optical signal into an electric signal, 6) detecting phase components from the electric signal, and 7) data processing of the detected phase components. Of them, 1) to 4) are operations of restoring the signal using light and are called "optical hybrid", and 5) to 7) are operations of restoring the signal using an electric signal.

FIG. 1 is a block diagram showing the concept of an optical hybrid of a conventional optical phase diversity receiver. An optical signal S and a local oscillator optical signal LO are received to the optical phase diversity receiver. The optical signal S and the local oscillator optical signal LO both have TE and TM components.

The received optical signal S is separated into a TE component and a TM transverse magnetic component by a first polarization separator 11. The TE component of the optical signal S is distributed in power by a first optical distributor 21, and the distributed components are respectively transmitted to first and second couplers 41 and 42. The TM component of the optical signal S is distributed in power by a third optical distributor 23, and the distributed components are respectively transmitted to third and fourth couplers 43 and 44.

The local oscillator optical signal LO for amplifying the optical signal S is separated into a TE component and a TM component by a second polarization separator 12. The TE component of the local oscillator optical signal LO is distributed in power by a second optical distributor 22, and the distributed components are respectively transmitted to the first and second couplers 41 and 42. The TM component of the local oscillator optical signal LO is distributed in power by a fourth optical distributor 24, and the distributed components are respectively transmitted to the third and fourth couplers 43 and 44. The local oscillator optical signal LO having the TE component is shifted by 90° by a first phase shifter 31 while it is transmitted to the second coupler 42. The local oscillator optical signal LO having the TM component is shifted by 90° by a second phase shifter 31 while it is transmitted to the fourth coupler 44.

Transmitted to the first coupler 41, the optical signal S having the TE component and the local oscillator optical signal LO having the TE component are combined with each other by an interference phenomenon, and the combined optical signal is separated into I and I-bar components with a phase difference of 180° and outputted from first and second output terminals 51 and 52 of the first coupler. Transmitted to the second coupler 42, the optical signal S having the TE component and the local oscillator optical signal LO having the TE component are combined with each other by an interference phenomenon, and the combined optical signal is separated into Q and Q-bar components with a phase difference of 180° and outputted from first and second output terminals 53 and 54 of the second coupler.

Transmitted to the third coupler 43, the optical signal S having the TM component and the local oscillator optical signal LO having the TM component are combined with each other by an interference phenomenon, and the combined optical signal is separated into I and I-bar components with a phase difference of 180° and outputted from first and second output terminals 55 and 56 of the third coupler. Transmitted to the fourth coupler 44, the optical signal S having the TM component and the local oscillator optical signal LO having the TM component are combined with each other by an interference phenomenon, and the combined optical signal is separated into Q and Q-bar components with a phase difference of 180° and outputted from first and second output terminals 57 and 58 of the fourth coupler.

The conventional optical phase diversity receiver having the above-mentioned configuration is problematic in that because it includes, to embody the optical hybrid, the polarization separator, the plurality of optical distributors, the couplers, the phase shifter and the optical waveguides connecting these components, the size thereof is comparatively large, and the production cost is increased.

SUMMARY

Various embodiments of the present disclosure are directed to an optical phase diversity receiver for coherent optical communication which is capable of embodying optical hybrid for a single-wavelength signal using a single optical element.

Furthermore, various embodiments of the present disclosure are directed to an optical phase diversity receiver for coherent optical communication which is capable of embodying optical hybrid for a multi-wavelength signal using a single optical element.

One embodiment of the present disclosure provides an optical phase diversity receiver for coherent optical communication, including: a diffraction grating including a plurality of grating surfaces; a first input waveguide to which a first optical signal is inputted; a second input waveguide to which a second optical signal is inputted; and a slab waveguide. Every predetermined number of grating surfaces are chirped in an identical manner.

The plurality of grating surfaces may be configured such that each of the optical signals reflected by the diffraction grating is divided into the predetermined number by optical power distribution.

The slab waveguide may include an input terminal optically coupled with the first and second input waveguides, and an output terminal provided at a position at which optical signals reflected by the diffraction grating reach the slab waveguide. The slab waveguide may be configured to guide the first optical signal and the second optical signal received on the input terminal to the diffraction grating and guide the optical signals reflected by the diffraction grating to the output terminal.

The second input waveguide may be disposed at a predetermined angle relative to the first input waveguide such that an angle at which the first optical signal is incident on the slab waveguide and an angle at which the second optical signal is incident on the slab waveguide differ from each other. The predetermined angle may be determined such that a reflection angle of the first optical signal reflected by the diffraction grating and a reflection angle of the second optical signal reflected by the diffraction grating are identical with each other.

The first input waveguide and the second input waveguide may be disposed such that a diffraction order of the first optical signal and a diffraction order of the second optical signal differ from each other on the input terminal of the slab waveguide.

In another embodiment, the optical phase diversity receiver may further include first to eighth output waveguides optically coupled to the output terminal.

In an embodiment, the first to fourth output waveguides may be respectively and optically coupled at positions at which TE (transverse electric) components of the optical signals reflected by the diffraction grating reach the output terminal.

In an embodiment, the fifth to eighth output waveguides may be respectively and optically coupled at positions at which TM (transverse magnetic) components of the optical signals reflected by the diffraction grating reach the output terminal.

Each of the plurality of grating surfaces may be a grating surface by which an incident optical signal is reflected according to equation 1.

The equation 1 may be $$d(\sin(\alpha) + \sin(\theta_m)) = \frac{m\lambda}{n_{\text{eff}}}.$$

d may denote an interval of one grating surface of the plurality of grating surfaces, $\alpha$ may denote an incident angle of the incident optical signal, $\theta_m$ may denote a reflection angle depending on a diffraction order of the incident optical signal, m may denote a diffraction order of the incident optical signal, $\lambda$ may denote a wavelength of the incident optical signal, and $n_{\text{eff}}$ may denote an effective refractive index.

In an embodiment, the output terminal may be disposed such that optical signals that are respectively incident on the first to fourth output waveguides have different phases, and optical signals that are respectively incident on the fifth to eighth output waveguides have different phases.

In an embodiment, the first output waveguide may be optically coupled with the output terminal at a point at which an optical signal having an I (0°) component focuses on the output terminal.

In an embodiment, the second output waveguide may be optically coupled with the output terminal at a point at which an optical signal having an I-bar) (180°) component focuses on the output terminal.

In an embodiment, the third output waveguide may be optically coupled with the output terminal at a point at which an optical signal having a Q (90°) component focuses on the output terminal.

In an embodiment, the fourth output waveguide may be optically coupled with the output terminal at a point at which an optical signal having a Q-bar) (270°) component focuses on the output terminal.

In an embodiment, the fifth output waveguide may be optically coupled with the output terminal at a point at which an optical signal having an I (0°) component focuses on the output terminal.

In an embodiment, the sixth output waveguide may be optically coupled with the output terminal at a point at which an optical signal having an I-bar) (180°) component focuses on the output terminal.

In an embodiment, the seventh output waveguide may be optically coupled with the output terminal at a point at which an optical signal having a Q (90°) component focuses on the output terminal.

In an embodiment, the eighth output waveguide may be optically coupled with the output terminal at a point at which an optical signal having a Q-bar) (270°) component focuses on the output terminal.

In another embodiment, the optical phase diversity receiver may further include an optical detector optically coupled with the first to eighth output waveguides at a side opposite to the output terminal and configured to receive an optical signal and convert the received optical signal into an electrical signal.

The plurality of grating surfaces may be configured such that positions or reflection angles of every predetermined number of the grating surfaces are chirped in an identical manner.

The predetermined number of grating surfaces may be defined as one period

The plurality of grating surfaces may include a first grating surface and a second grating surface that are repeatedly arranged each period.

The first grating surface and the second grating surface may differ in length of a path of an optical signal based on a center wavelength.

The length of a path of an optical signal formed by the first grating surface may be shorter or longer than the length of a path of an optical signal formed by the second grating surface by a predetermined multiple based on the center wavelength. The predetermined multiple may include a fraction.

In another embodiment, a reflection angle of the first grating surface and a reflection angle of the second grating surface may be determined such that a diffraction order depending on the reflection angle of the first grating surface and a diffraction order depending on the reflection angle of the second grating surface differ from each other.

The diffraction order depending on the reflection angle of the first grating surface and the diffraction order depending on the reflection angle of the second grating surface may have an integer multiple difference therebetween.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
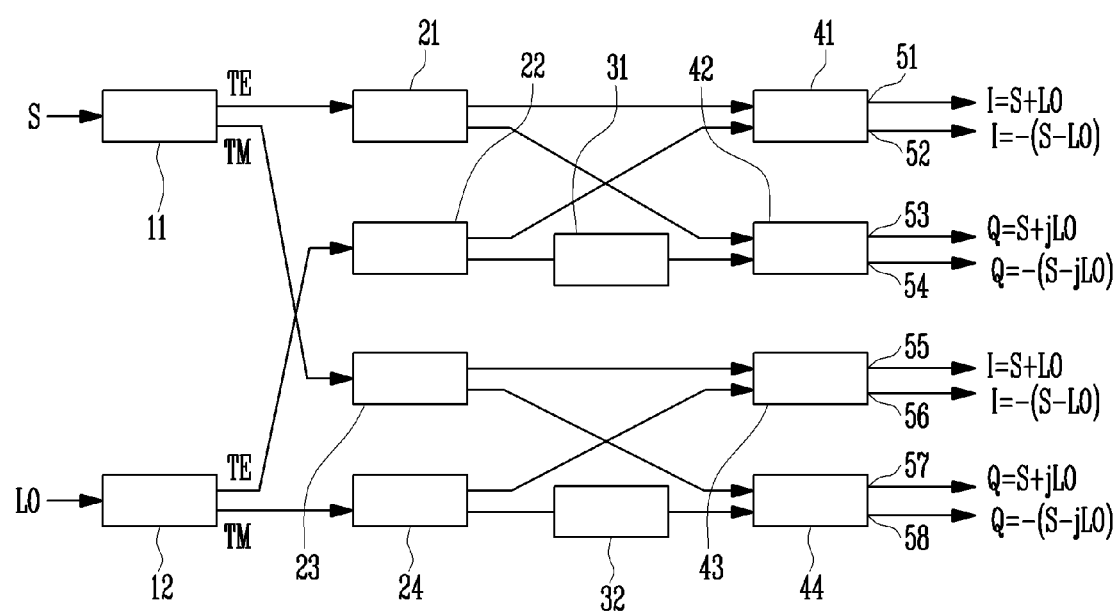
FIG. 1 is a block diagram showing the concept of an optical hybrid of a conventional optical phase diversity receiver.

Advantages and features of the present disclosure, and methods for achieving the same will be cleared with reference to embodiments described later in detail together with the accompanying drawings. The present disclosure is not limited to the following embodiments, and various modifications are possible. It will be understood that when a component is referred to as being "coupled" or "connected" to another component, it may be directly coupled or connected to the other element or the two elements may be electrically coupled with each other with another element interposed therebetween. Furthermore, in drawings, portions unrelated to the present invention have been omitted to clarify the description of the present invention, and the same reference numerals are used throughout the different drawings to designate the same or similar components.

Hereinafter, embodiments of the present disclosure will be described in detail with reference to the attached drawings so that those skilled in the art can easily implement the present disclosure.

An optical phase diversity receiver for coherent optical communication according to an embodiment of the present disclosure includes a plurality of input waveguides 110 and 120, a plurality of output waveguides 410, 420, 430, 440, 450, 460, 470 and 480, a diffraction grating 200, a slab waveguide 300 which is disposed between the input waveguides, the output waveguides and the diffraction grating, an optical detector 510 which converts optical signals outputted from the output waveguides into electrical signals, a plurality of differential amplifiers 521, 522, 523 and 524 which are provided on output terminals of the optical detector 510, and a digital signal processor 530 which processes amplified signals.

The plurality of input waveguides include a first input waveguide 110 and a second input waveguide 120. Each of the first and second input waveguides is a waveguide through which an optical signal moves. A first optical signal S1 is inputted through the first input waveguide 110, and a second optical signal S2 is inputted through the second input waveguide 120.

The first optical signal S1 includes TE (transverse electric) and TM (transverse magnetic) components which are perpendicular to each other. The first optical signal S1 may be an optical signal which is polarization-combined and phase-shifted by optical communication. The second optical signal S2 is a signal which is transmitted, along with the first optical signal, to the slab waveguide 300 so as to amplify the first optical signal, and includes TE and TM components. In an embodiment, the second optical signal may be an optical signal of a local oscillator.

Figure 3:
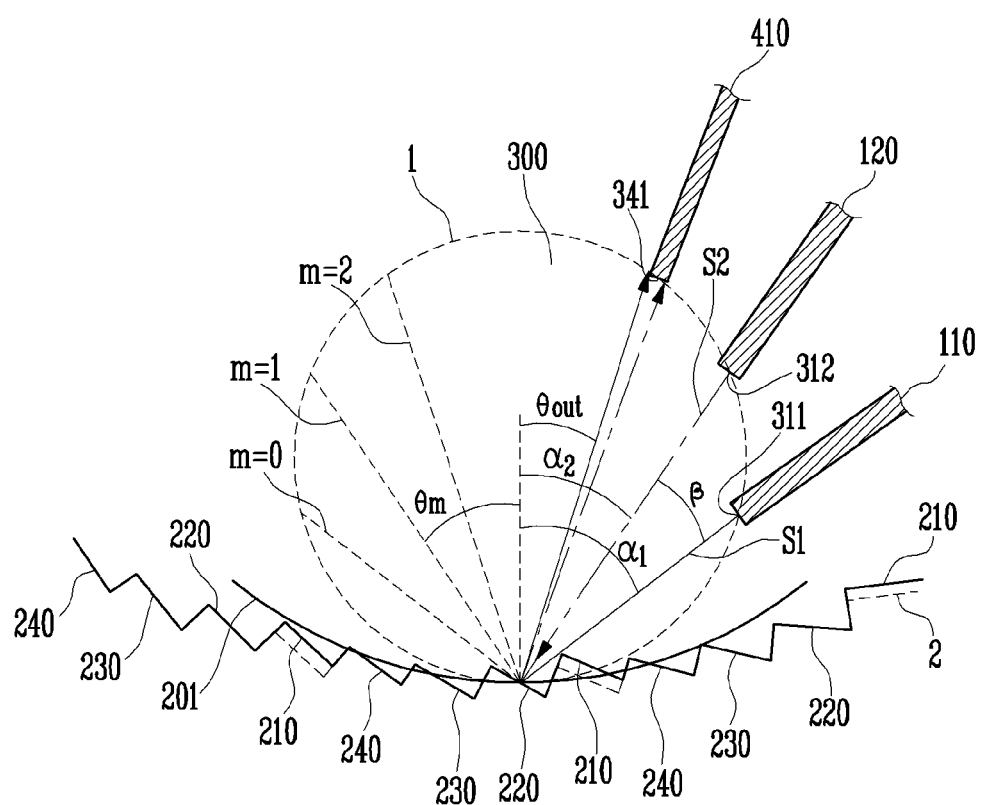
FIG. 3 is an enlarged view of a diffraction grating of the embodiment of FIG. 2 and a plan view showing the principle that a first optical signal and a second optical signal are combined on the diffraction grating.

The slab waveguide 300 includes input terminals 311 and 312 which are optically coupled with the first and second input waveguides 110 and 120, and output terminals 341, 342, 343, 344, 345, 346, 347 and 348 which are optically coupled with the plurality of output waveguides. Referring to FIG. 3, the input terminals and the output terminals of the slab waveguide 300 are disposed on points corresponding to a circle known as a Rowland circle 1. Although, among the plurality of output waveguides, only a first output waveguide 410 is illustrated in FIG. 3, second to eighth output waveguides are also optically coupled to the output terminals of the slab waveguide 300, of course.

The slab waveguide 300 is coupled with the diffraction grating 200 at a position opposite to the input terminals and the output terminals. The diffraction grating 200 is a reflective diffraction grating which is formed to be concave toward the slab waveguide 300. When it is assumed that the diffraction grating 200 is formed to be concave along an imaginary circle 201 having a radius R, the radius of the Rowland circle 1 is R/2. The Rowland circle 1 is a well-known concept; therefore, further detailed explanation will be omitted.

The slab waveguide 300 guides the first optical signal S1 and the second optical signal S2 such that the first and second optical signals S1 and S2 inputted from the input terminals are combined, and reach the diffraction grating 200. Also, the slab waveguide 300 guides optical signals reflected by the diffraction grating 200 such that the reflected optical signals reach the output terminals. The first optical signal S1 and the second optical signal S2 are combined with each other by interference in the slab waveguide 300. The first and second optical signals S1 and S2 are controlled such that a combined signal of the first and second optical signals S1 and S2 is outputted from the same point of the output terminal of the slab waveguide 300 by adjusting incidence angles and diffraction orders of the optical signals.

Figure 2:
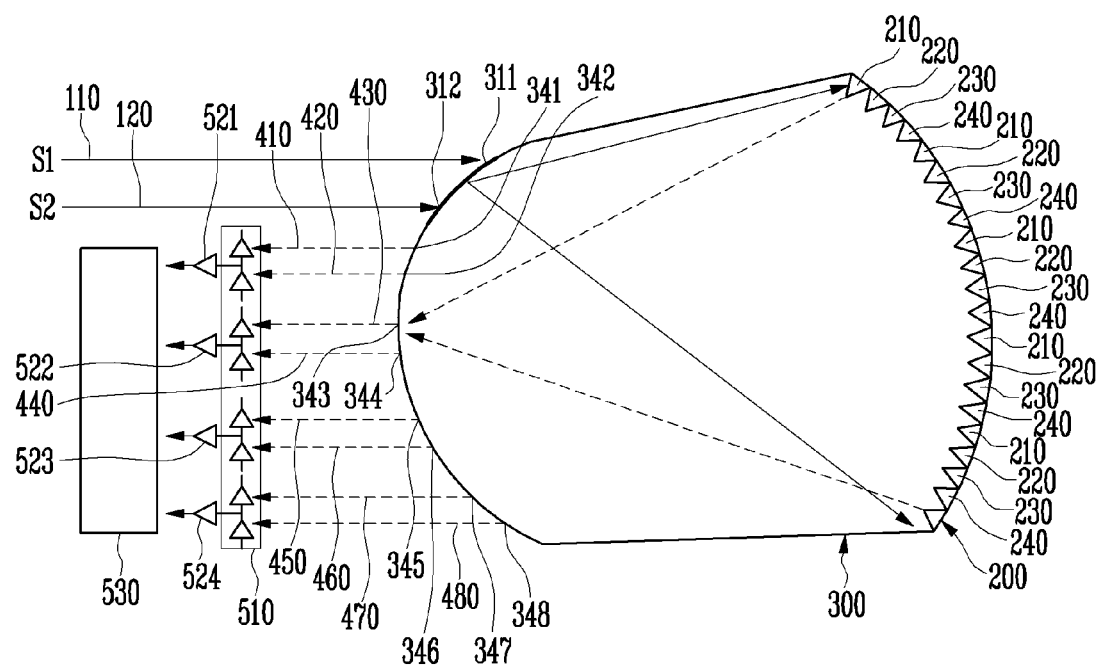
FIG. 2 is a top view illustrating an embodiment of the present disclosure.

Referring to FIG. 2, the first optical signal S1 and the second optical signal S2 that are inputted to the input terminals of the slab waveguide 300 reach the diffraction grating 200 while spreading, as shown by the solid arrows, and then are combined by interference. Referring to FIG. 3, the first input waveguide 110 and the second input waveguide 120 may be disposed such that an incidence angle $\theta_{in1}$ of the first optical signal S1 and an incidence angle $\theta_{in2}$ of the second optical signal S2 differ from each other.

The optical signal that has reached the diffraction grating 200 is diffraction-reflected according to the following equation 1. A reflection angle $\theta_m$ is determined depending on a period d of the diffraction grating, an incidence angle α, an input wavelength λ, an effective refractive index $n_{eff}$ of the slab waveguide, and a diffraction order m.

$$d(\sin(\alpha) + \sin(\theta_m)) = \frac{m\lambda}{n_{eff}}$$ [Equation 1]

Referring to FIG. 3, the diffraction order m is given in the form of (+) or (−) integer while the incidence angle is 0. The reflection angle $\theta_m$ is determined into (+) or (−) integer multiple depending on the diffraction order. In FIG. 3, $\theta_m$ is expressed at a position at which the diffraction order m is 1 for illustrative purpose, but the reflection angle of the optical signal reflected by the diffraction grating 200 is not limited to this. The shape of the diffraction grating 200 may be determined such that an optical signal is focused, among reflection angles $\theta_m$ determined depending on diffraction orders m, on a desired diffraction-reflection angle $\theta_{out}$. That is, the shape of the diffraction grating is determined such that the desired diffraction-reflection angle $\theta_{out}$ becomes one of the reflection angles $\theta_m$ determined depending on the diffraction orders.

To coincide the reflection angles of the first and second optical signals that are incident at different angles, orientation angles of the first and second input waveguides 110 and 120, in other words, an incident angle $\theta_{in1}$ and a diffraction order $m_1$ of the first optical signal S1 and an incident angle $\theta_{in2}$ and a diffraction order $m_2$ of the second optical signal S2 should be appropriately determined.

Because the first optical signal S1 and the second optical signal S2 have the same effective refractive index $n_{eff}$ and wavelength λ and are diffraction-reflected by the same diffraction grating 200, the grating periods d thereof are also the same as each other. Therefore, when the incident angle of the first optical signal is $\theta_{in1}$, the incident angle of the second optical signal is $\theta_{in2}$, the diffraction order of the first optical signal is $m_1$, and the diffraction order of the second optical signal is $m_2$, the incident angle and diffraction order of the first optical signal and the incident angle and diffraction order of the second optical signal can be determined by the following equation 2 based on the equation 1.

$$\lambda(m_1-m_2)=d\times n_{eff}(\sin(\theta_{in1})-\sin(\theta_{in2}))$$ [Equation 2]

For example, when the diffraction order $m_1$ of the first optical signal S1 is 3 and the diffraction order $m_2$ of the second optical signal S2 is 1, the orientation angle of the second input waveguide 120 is determined such that when the first optical signal S1 is incident at a predetermined incident angle $\theta_{in1}$, the second optical signal S2 is incident at an incident angle $\theta_{in2}$ calculated according to the equation 2.

In an aspect of the above-mentioned configuration, because the first input waveguide and the second input waveguide are disposed such that the respective reflection angles of the first and second optical signals that are incident on the slab waveguide 300 are the same, there is an effect that the first optical signal and the second optical signal can be combined with each other without using a separate coupler.

Each of the first and second optical signals S1 and S2 inputted to the input terminals of the slab waveguide 300 includes a TE component and a TM component. In this regard, since a TE signal and a TM signal that pass through the slab waveguide 300 differ in distribution of light from each other, the effective reflective indexes $n_{eff}$ of the TE signal and the TM signal also differ from each other. Therefore, in the optical signal reflected by the diffraction grating 200, the TE signal and TM signal are reflected at different angles, so that polarization components of the optical signal are separated.

Referring to FIG. 2, the optical signals reflected by the diffraction grating 200 reach the output terminals as shown by the dotted arrow. The first to fourth output waveguides 410, 420, 430 and 440 are optically coupled to the output terminals of the slab waveguide at respective points 341, 342, 343 and 344 at which the TE signals reach the output terminals. The fifth to eighth output waveguides 450, 460, 470 and 480 are optically coupled to the output terminals of the slab waveguide at respective points 345, 346, 347 and 348 at which the TM signals reach the output terminals.

In an aspect of the above-mentioned configuration, the polarization components of the optical signal are separated by the diffraction grating and outputted therefrom.

The diffraction grating 200 includes a plurality of grating surfaces 210, 220, 230 and 240. Every predetermined number of plurality of grating surfaces are chirped in the same manner. Each grating surface is a grating surface by which an optical signal is reflected according to the equation 1. The optical power of the optical signal may be distributed by the plurality of grating surfaces by the predetermined number of grating surfaces. The plurality of grating surfaces are determined in shape or reflection angle such that optical signals reflected by the diffraction grating are prevented from being completely reinforced/offset at a point at which the optical signals reach the output waveguide.

In an embodiment, to separate the optical power of the optical signal reflected by the diffraction grating 200 into four parts, the diffraction grating 200 may be configured such that the height of the first grating surface 210 and the height of the second grating surface 220 differ from each other by ½ times a center wavelength λc. That is, in the present embodiment, the predetermined number of grating surfaces is four. Four grating surfaces are disposed each period, and the grating surfaces are repeatedly chirped. Detailed description is as follows.

In FIG. 3, there is illustrated an uniform reflective concave diffraction grating for the sake of understanding of an embodiment of the plurality of grating surfaces according to the present disclosure. The uniform reflective concave diffraction grating 2 (hereinafter, referred to as the "uniform diffraction grating") means a grating which is formed to be concave in such a way that a flat diffraction grating including grating surfaces that are arranged at the same intervals with the same shape and angle is projected onto an imaginary circle 201 having a radius R.

The first grating surface 210 is higher in height than the uniform diffraction grating 2 by ½ times the size of the center wavelength λc. The second grating surface 220, the third grating surface 230 and the fourth grating surface 240 each have the same height as that of the uniform diffraction grating 2. Therefore, the first grating surface 210 is higher in height than the second grating surface 220 by ½ times the center wavelength λc. The second grating surface 220, the third grating surface 230 and the fourth grating surface 240 have the same height. Here, the term "center wavelength λc" refers to a wavelength which is optimized in characteristics of the same element as the plurality of grating surfaces in a communication wavelength band. The concepts of the communication wavelength band and the center wavelength are well known; therefore, detailed explanation will be omitted.

The first to fourth grating surfaces 210, 220, 230 and 240 are successively disposed and repeatedly arranged in such a way that another first grating surface 210 is disposed beside the fourth grating surface 240.

In another embodiment in which the optical power of the optical signal reflected by the diffraction grating 200 is distributed into four parts, the height of the first grating surface 210 may be lower than the uniform diffraction grating 2 by ½ times of the center wavelength λc.

In this way, depending on the number of parts into which the optical power is distributed, the height of each of the plurality of grating surfaces and the number of grating surfaces which are periodically repeated are changed, whereby the optical power of the optical signal can be distributed in a desired manner. As such, the diffraction grating for distributing the optical power may be configured such the height of at least grating surface among the plurality of grating surfaces provided on the uniform diffraction grating 2 of FIG. 3 different from the height of another grating surface by a multiple predetermined based on the center wavelength.

Thereby, the length of an optical path of the optical signal is reduced or increased based on the center wavelength, so that optical signals reflected by the diffraction grating are prevented from being completely reinforced/offset at the point at which they reach the output waveguide, whereby optical power can be distributed.

Figure 4:
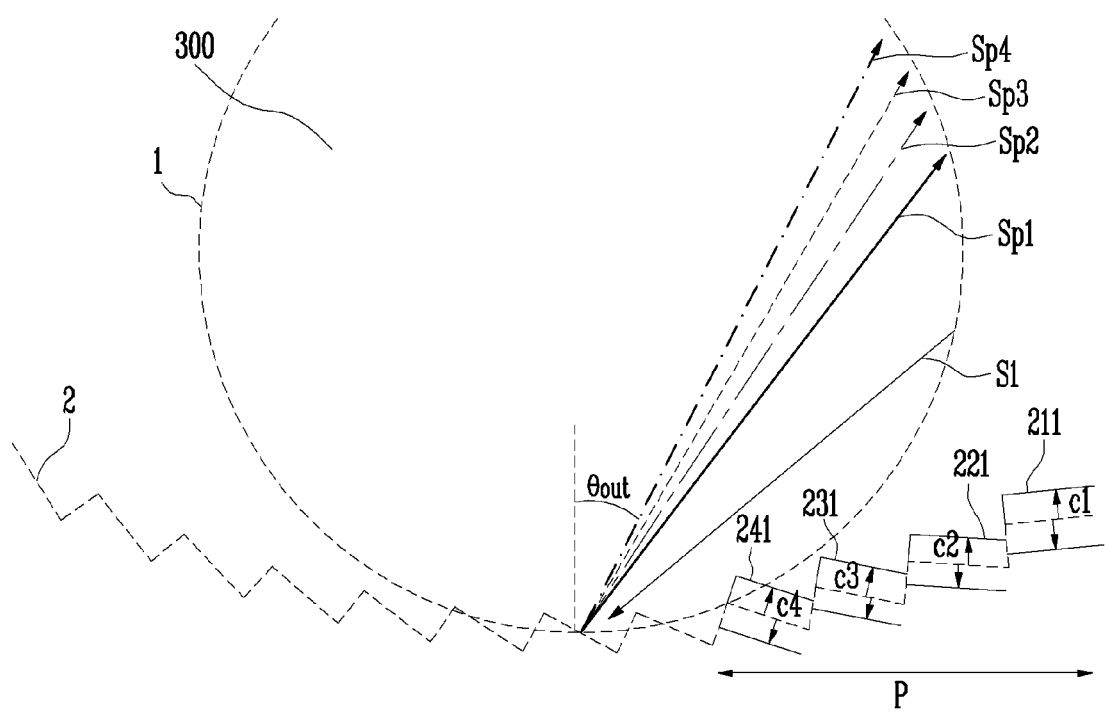
FIG. 4 is a plan view showing the principle that optical power is distributed by various embodiments of the diffraction grating according to the present disclosure.

FIG. 4 illustrates other embodiments configured such that the heights of the grating surfaces of the diffraction grating according to the present disclosure are raised or lowered based on the center wavelength depending on the number of parts into which the optical power is distributed.

In an embodiment of the diffraction grating for distributing the optical power of the optical signal into two parts, the plurality of grating surfaces may include first grating surfaces 211 and second grating surfaces 221 which are repeatedly and alternately disposed. The first grating surface 211 becomes higher or lower than the height of the uniform diffraction grating 2 by ¼ times the center wavelength. That is, a height change rate c1 of the first grating surface may be ¼ times the center wavelength. The height of the second grating surface is the same as that of the uniform diffraction grating 2. A height change rate c2 of the second grating surface may be zero based on the center wavelength.

If the first optical signal S1 is incident as shown in FIG. 4, an optical path of the optical signal reflected by the first grating surface is shortened or lengthened by ¼ times the center wavelength compared to an optical path formed by the second grating surface, so that the phases thereof on the output terminals of the slab waveguide 300 are not coincided, whereby light remains rather than being completely offset. Therefore, the first optical signal S1 is separated into a first distributed optical signal Sp1 and a second distributed optical signal Sp2 and outputted from the output terminals of the slab waveguide 300. In this regard, the first distributed optical signal and the second distributed optical signal differ in reflection angle from each other, but have the same diffraction order.

In an embodiment of a diffraction grating for distributing the optical power of the optical signal into three parts, a plurality of grating surfaces may include a first grating surface 211, a second grating surface 221 and a third grating surface 231 which are successively disposed and periodically repeatedly arranged. A height change rate c1 of the first grating surface may be ⅓ times the center wavelength. A height change rate c2 of the second grating surface and a height change rate c3 of the third grating surface may be zero based on the center wavelength.

If the first optical signal S1 is incident as shown in FIG. 4, an optical path of the optical signal reflected by the grating surface having the height change rate c1 that is ⅓ times the center wavelength is shortened or lengthened by ⅓ times the center wavelength compared to the optical paths formed by the other two grating surfaces. Therefore, the first optical signal S1 is separated into a first distributed optical signal Sp1, a second distributed optical signal Sp2 and a third distributed optical signal Sp3 and outputted from the output terminals of the slab waveguide 300. In this regard, the first to third distributed optical signals differ in reflection angle from each other, but have the same diffraction order.

In an embodiment of a diffraction grating for distributing the optical power of the optical signal into four parts, a plurality of grating surfaces may include first to fourth grating surfaces 211, 221, 231 and 241 which are successively disposed and periodically repeatedly arranged. This is as described with reference to FIG. 3. As described above, a height change rate c1 of the first grating surface is ½ times the center wavelength. A height change rate c2 of the second grating surface, a height change rate c3 of the third grating surface, and a height change rate c4 of the fourth grating surface may be zero based on the center wavelength. The first to fourth grating surfaces are repeatedly arranged and successively disposed each period P.

If the first optical signal S1 is incident as shown in FIG. 4, an optical path of the optical signal reflected by the grating surface having the height change rate c1 that is ½ times the center wavelength is shortened or lengthened by ½ times the center wavelength compared to the optical paths formed by the other three grating surfaces. Therefore, the first optical signal S1 is separated into a first distributed optical signal Sp1, a second distributed optical signal Sp2, a third distributed optical signal Sp3 and a fourth distributed optical signal Sp4 and outputted from the output terminals of the slab waveguide 300. In this regard, the first to fourth distributed optical signals differ in reflection angle from each other, but have the same diffraction order.

Likewise, in an embodiment of a diffraction grating for distributing the optical power of the optical signal into five parts, a plurality of grating surfaces may include first to fifth grating surfaces which are repeatedly arranged and successively disposed each period having five grating surfaces. A height change rate of the first grating surface may be ⅕ times the center wavelength, a height change rate of the second grating surface may be ⅗ times the center wavelength, and a height change rate of the third grating surface may be ⅕ times the center wavelength. A height change rate of each of the fourth and fifth grating surfaces may be zero based on the center wavelength.

In this way, to distribute the optical power of the optical signal into an N number of parts, an N number of grating surfaces are successively disposed each period while a plurality of grating surfaces may be repeatedly arranged. The height of each of the N number of grating surfaces is determined such that the length of the optical path thereof is lengthened or shortened by a predetermined multiple based on the center wavelength so that the optical signals can be prevented from being reinforced/offset on the output terminals of the slab waveguide 300 and thus the optical power can be distributed into an N number of parts.

The degree of the height change rate of each grating surface is only for illustrative purpose, the present disclosure is not limited to this. Any type diffraction grating may be used so long as it can cause an optical path difference so that phases of light beams reflected by the diffraction grating do not coincide on the output terminal of the slab waveguide whereby the optical power can be distributed into an N number of parts. For example, although it has been described that the height change rate of the first grating surface may be a half of the center wavelength to distribute the optical signal reflected by the diffraction grating into four parts, this is only for illustrative purpose. That is, in even when it is desired to distribute the optical power into four parts, the height change rates of the first to fourth grating surfaces may differ from those of the above-described case.

Figure 5:
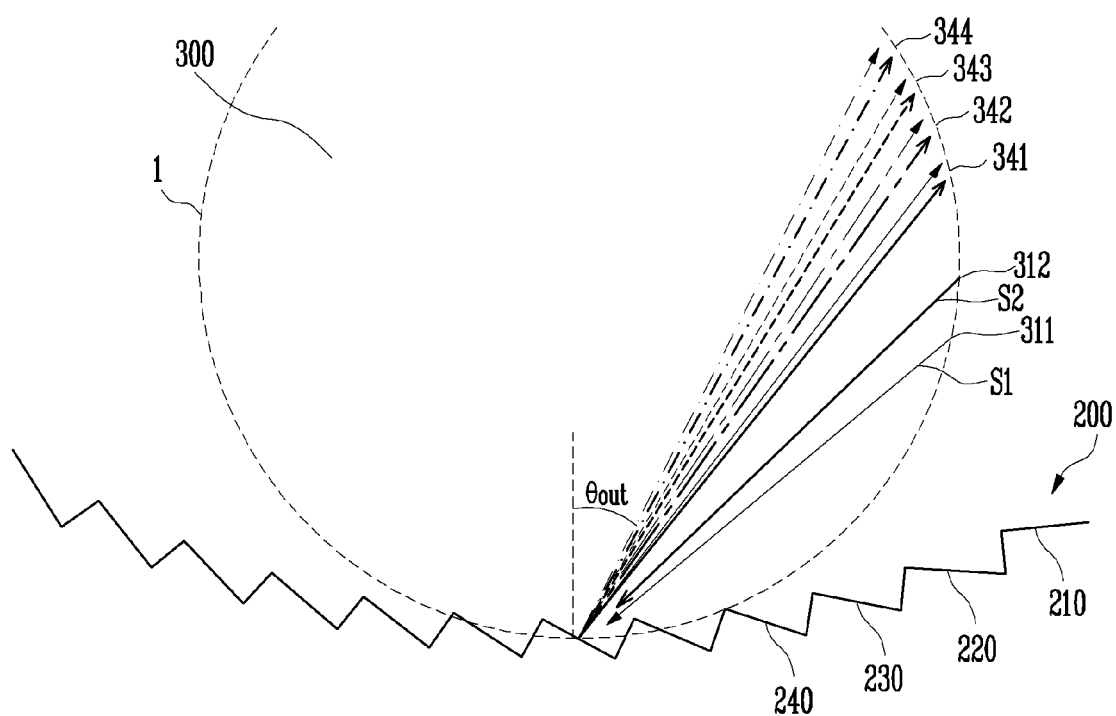
FIG. 5 is a plan view showing the principle that the first optical signal and the second optical signal are combined, polarization-separated, distributed in optical power, and separated in phase by the diffraction grating of the embodiment of FIG. 2.

If a QPSK signal separator is used for the diffraction grating 200 of FIG. 3, the first optical signal S1 and the second optical signal S2 interfere with each other in the slab waveguide 300 and thus are combined with each other, and points at which the signals are diffraction-reflected become the same. As a result, combined light is outputted from the output terminal of the slab waveguide. FIG. 5 illustrates the case where, among optical signals separated into TE components and TM components while being reflected by the diffraction grating 200, optical signals of a TE polarized state are combined and phase-separated, and then outputted to first to fourth output terminals 341, 342, 343 and 344 of the slab waveguide. Although not shown, in the same principle, optical signals of a TM polarized state are also combined and phase-separated, and then outputted to fifth to eighth output terminals 345, 346, 347 and 348.

Referring to FIGS. 2 and 5, the first optical signal S1 inputted to the first input terminal 311 of the slab waveguide and the second optical signal S2 inputted to the second input terminal 312 of the slab waveguide are reflected by the diffraction grating 200 and separated into TE components and TM components depending on a difference in effective refractive index. Furthermore, the first optical signal and the second optical signal are reflected by the diffraction grating 200 at the same reflection angle, and then distributed in optical power and phase before being outputted to the first to eighth output terminals of the slab waveguide.

Referring to FIG. 5, a signal having an I (0°) component among TE polarization components of the combined signal is outputted to the first output terminal 341, a signal having an I-bar (180°) component among the TE polarization components of the combined signal is outputted to the second output terminal 342, a signal having a Q (90°) component among the TE polarization components of the combined signal is outputted to the third output terminal 343, and a signal having a Q-bar (270°) component among the TE polarization components of the combined signal is outputted to the fourth output terminal 344.

As described above, the positions and angles of the first to fourth grating surfaces and a difference in angle between the first input waveguide 110 and the second input waveguide 120 are determined such that optical combination, optical power distribution, and phase distribution are performed. Furthermore, the diffraction order m1 of the first optical signal and the diffraction order m2 of the second optical signal differ from each other, and each diffraction order is determined such that the reflection angles are the same as each other based on the equation 1 and 2.

In this way, the TM polarization components of the combined signal are also separated in phase and are outputted to the fifth to eighth output terminals. Referring to FIG. 2, a signal having an I (0°) component among TM polarization components of the combined signal is outputted to the fifth output terminal 345, a signal having an I-bar (180°) component among the TM polarization components of the combined signal is outputted to the sixth output terminal 346, a signal having a Q (90°) component among the TM polarization components of the combined signal is outputted to the seventh output terminal 347, and a signal having a Q-bar (270°) component among the TM polarization components of the combined signal is outputted to the eighth output terminal 348.

The plurality of output waveguides includes the first to eighth waveguides 410, 420, 430, 440, 450, 460, 470 and 480. Optical signals that are polarization-separated, phase-separated and distributed in optical power while being reflected by the diffraction grating 200 reach the output terminals 341, 342, 343, 344, 345, 346, 347 and 348 of the slab waveguide 300, as shown by the dotted arrows of FIG. 2.

The first to fourth output waveguides 410, 420, 430 and 440 are optically coupled to positions at which, among the optical signals reaching the output terminals of the slab waveguide 300, the optical signals having the TE component are outputted. The first to fourth output waveguides 410, 420, 430 and 440 are disposed on the output terminals of the slab waveguide such that the optical signals having the TE component that are inputted to the respective output waveguides have different phases.

The first output waveguide 410 is optically coupled to the first output terminal 341 of the slab waveguide, and the second output waveguide 420 is optically coupled to the second output terminals 342 of the slab waveguide. A combined optical signal (I=S1+S2) having the TE component and the I component is outputted through the first output waveguide 410, and a combined optical signal (I=−(S1−S2)) having the TE component and the I-bar component is outputted through the second output waveguide 420.

The third output waveguide 430 is optically coupled to the third output terminal 343 of the slab waveguide, and the fourth output waveguide 440 is optically coupled to the fourth output terminals 344 of the slab waveguide. Therefore, a combined optical signal (Q=S1+jS2) having the TE component and the Q component is outputted through the third output waveguide 430. A combined optical signal (Q=−(S1−jS2)) having the TE component and the Q-bar component is outputted through the fourth output waveguide 440.

The fifth to eighth output waveguides 450, 460, 470 and 480 are optically coupled to positions at which, among the optical signals reaching the output terminals of the slab waveguide 300, the optical signals having the TM component are outputted. The fifth to eighth output waveguides 450, 460, 470 and 480 are disposed on the output terminals of the slab waveguide such that the optical signals having the TM component that are inputted to the respective output waveguides have different phases.

The fifth output waveguide 450 is optically coupled to the fifth output terminal 345 of the slab waveguide so that a combined optical signal (I=S1+S2) having the TM component and the I component is outputted through the fifth output waveguide 450. The sixth output waveguide 460 is optically coupled to the sixth output terminal 346 of the slab waveguide so that a combined optical signal (I=−(S1−S2) having the TM component and the I component is outputted through the sixth output waveguide 460.

The seventh output waveguide 470 is optically coupled to the seventh output terminal 347 of the slab waveguide so that a combined optical signal (Q=S1+jS2) having the TM component and the Q component is outputted through the seventh output waveguide 470. The eighth output waveguide 480 is optically coupled to the eighth output terminal 348 of the slab waveguide so that a combined optical signal (Q=−(S1−jS2) having the TM component and the Q component is outputted through the eighth output waveguide 480.

Each of first and second input waveguides and the first to eighth output waveguides may be made of any known optical fiber, coaxial cable or hollow metal tube.

Optical signals outputted from the first to eighth output waveguides are respectively converted into electrical signals by the optical detector 510. The first to fourth differential amplifiers 521, 522, 523 and 524 detect phase component signals, and the digital signal processor 530 processes signals through the detected phase component signals and restores them. The optical detector, the first to fourth differential amplifier and the digital signal processor are devices used for optical communication, and any known device may be used for them as long as it can convert an optical signal obtained through optical hybrid into an electrical signal and restore the optical signal.

In an aspect of the above-described configuration, the first optical signal and the second optical signal are combined with each other by the slab waveguide 300, and the polarization components of the combined optical signal are separated by the diffraction grating 200 and, simultaneously, the optical power thereof is distributed. Furthermore, the phase components are separated depending on a point on which an optical signal reflected by the diffraction grating 200 focuses.

Therefore, when single-wavelength optical signals are inputted, combination of the optical signals, TE/TM separation, optical power distribution and I/Q separation can be processed at the same time. Furthermore, when multi-wavelength optical signals are inputted, the wavelengths are also separated by the diffraction grating 200. Thus, there is an effect that combination of the optical signals, TE/TM separation, optical power distribution, I/Q separation and wavelength separation are processed at the same time. Consequently, it is possible to separate a modulated signal without using a polarization separator, a plurality of optical distributors or a coupler, whereby the configuration is simple, the volume is reduced, and the production cost is reduced.

In another embodiment of the present disclosure, a plurality of grating surfaces of the diffraction grating may be configured to have different reflection angles. Unlike the embodiment of FIG. 2 in which the grating surfaces of the diffraction grating are chirped such that the positions thereof are the same for each predetermined number of grating surfaces, in the present embodiment of the present invention, every predetermined number of the grating surfaces of the diffraction grating are chirped such that the reflection angles thereof are the same.

The present embodiment of the present disclosure includes a plurality of input waveguides 110 and 120, a plurality of output waveguides 410, 420, 430, 440, 450, 460, 470 and 480, a diffraction grating 250, a slab waveguide 300 which is disposed between the input waveguides, the output waveguides and the diffraction grating, an optical detector 510 which converts optical signals outputted from the output waveguides into electrical signals, a plurality of differential amplifiers 521, 522, 523 and 524 which are provided on output terminals of the optical detector 510, and a digital signal processor 530 which processes amplified signals.

Figure 6:
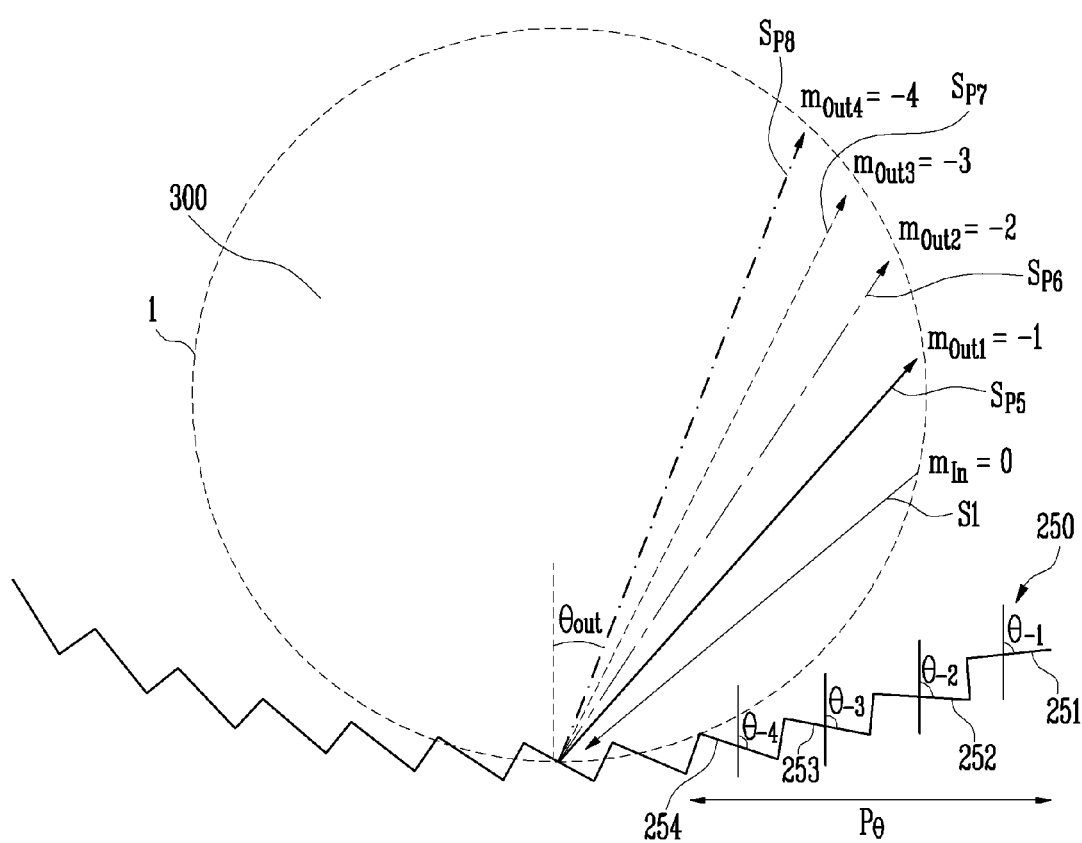
FIG. 6 is an enlarged view of a diffraction grating according to another embodiment of the present disclosure.

The general configuration of the present embodiment, other than the diffraction grating 250, is the same as that of the preceding embodiment, and like reference numerals are used to illustrate the same components. Referring to FIG. 6, the diffraction grating 250 includes first to fourth grating surfaces 251, 252, 253 and 254 which are repeatedly arranged and successively disposed each period ($P_\theta$) having a predetermined number of grating surfaces. Respective reflection angles of the first to fourth grating surfaces 251, 252, 253 and 254 are determined such that optical signals are reflected at angles corresponding to diffraction orders different from each other.

For example, when a first optical signal S1 is inputted to the slab waveguide 300 through the first input waveguide 110, it may be inputted at an angle corresponding to a diffraction order $m_{In}$ of 0. A reflection angle $\theta_{-1}$ of the first grating surface 251 is determined such that the optical signal is reflected to a position corresponding to a diffraction order $m_{out1}$ of −1. A reflection angle $\theta_{-2}$ of the second grating surface 252 is determined such that the optical signal is reflected to a position corresponding to a diffraction order $m_{out2}$ of −2. A reflection angle $\theta_{-3}$ of the third grating surface 253 is determined such that the optical signal is reflected to a position corresponding to a diffraction order $m_{out3}$ of −3. A reflection angle $\theta_{-4}$ of the fourth grating surface 254 is determined such that the optical signal is reflected to a position corresponding to a diffraction order $m_{out4}$ of −4.

In this way, when the reflection angles of every predetermined number (four in the present embodiment) of the grating surfaces are chirped, reflected optical signals are reflected at different reflection angles and thus reinforced and interfered on the output terminals of the slab waveguide. As such, the optical signals reflected by the first to fourth grating surfaces are all different in reflection angle and diffraction order, so that the optical power of the reflected optical signals can be distributed into four parts.

The reflection angles of the first to fourth grating surfaces may be determined such that they are in integer-multiple relationship. Although the diffraction grating of FIG. 6 is configured such that the diffraction orders of the first to fourth grating surfaces successively have differences of integer multiple therebetween, the present disclosure is not limited to this. That is, even if the diffraction orders on which the reflection angles of the first to fourth grating surfaces are formed do not successively have differences, optical power distribution is possible, so long as the diffraction orders differ from each other.

In this way, to separate the optical power of a received optical signal into an N number of parts, an N number of grating surfaces are configured such that the reflection angles thereof are formed on diffraction orders different from each other.

In yet another embodiment of the present disclosure, the diffraction grating described with reference to FIG. 3 which is chirped in positions of the grating surfaces and the diffraction grating described with reference to FIG. 6 which is chirped in reflection angles of the grating surfaces are combined with each other so as to optimize the optical power distribution.

According to an embodiment of the present disclosure, polarization separation, phase separation and optical power distribution of a single-wavelength signal are possible using a single diffraction grating.

According to an embodiment of the present disclosure, polarization separation, phase separation, optical power distribution and wavelength separation of a multi-wavelength signal are possible using a single diffraction grating.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An optical phase diversity receiver for coherent optical communication, comprising:
    a diffraction grating including a plurality of grating surfaces, wherein every predetermined number of grating surfaces are chirped in an identical manner;
    a first input waveguide to which a first optical signal is inputted;
    a second input waveguide to which a second optical signal is inputted; and
    a slab waveguide including an input terminal optically coupled with the first and second input waveguides, and an output terminal provided at a position at which optical signals reflected by the diffraction grating reach the slab waveguide, the slab waveguide being configured to guide the first and second optical signals received on the input terminal to the diffraction grating and guide the optical signals reflected by the diffraction grating to the output terminal,
    wherein the plurality of grating surfaces are configured such that each of the optical signals reflected by the diffraction grating is divided into the predetermined number by optical power distribution.

2. The optical phase diversity receiver according to claim 1,
    wherein the second input waveguide is disposed at a predetermined angle relative to the first input waveguide such that an angle at which the first optical signal is incident on the slab waveguide and an angle at which the second optical signal is incident on the slab waveguide differ from each other, and
    wherein the predetermined angle is determined such that a reflection angle of the first optical signal reflected by the diffraction grating and a reflection angle of the second optical signal reflected by the diffraction grating are identical with each other.

3. The optical phase diversity receiver according to claim 2,
    wherein the first input waveguide and the second input waveguide are disposed such that a diffraction order of the first optical signal and a diffraction order of the second optical signal differ from each other on the input terminal of the slab waveguide.

4. The optical phase diversity receiver according to claim 3, further comprising:
    first to eighth output waveguides optically coupled to the output terminal,
    wherein the first to fourth output waveguides are respectively and optically coupled at positions at which TE (transverse electric) components of the optical signals reflected by the diffraction grating reach the output terminal, and
    wherein the fifth to eighth output waveguides are respectively and optically coupled at positions at which TM (transverse magnetic) components of the optical signals reflected by the diffraction grating reach the output terminal.

5. The optical phase diversity receiver according to claim 4,
    wherein each of the plurality of grating surfaces is a grating surface by which an incident optical signal is reflected according to equation 1,
    wherein the equation 1 is $$d(\sin(\alpha) + \sin(\theta_m)) = \frac{m\lambda}{n_{eff}},$$

and
    d denotes an interval of one grating surface of the plurality of grating surfaces,
    $\alpha$ denotes an incident angle of the incident optical signal,
    $\theta_m$ denotes a reflection angle depending on a diffraction order of the incident optical signal,
    m denotes a diffraction order of the incident optical signal,
    $\lambda$ denotes a wavelength of the incident optical signal, and
    $n_{eff}$ denotes an effective refractive index.

6. The optical phase diversity receiver according to claim 4,
    wherein the output terminal is disposed such that optical signals that are respectively incident on the first to fourth output waveguides have different phases, and optical signals that are respectively incident on the fifth to eighth output waveguides have different phases.

7. The optical phase diversity receiver according to claim 6,
    wherein the first output waveguide is optically coupled with the output terminal at a point at which an optical signal having an I (0°) component focuses on the output terminal,
    wherein the second output waveguide is optically coupled with the output terminal at a point at which an optical signal having an I-bar (180°) component focuses on the output terminal,
    wherein the third output waveguide is optically coupled with the output terminal at a point at which an optical signal having a Q (90°) component focuses on the output terminal, and
    wherein the fourth output waveguide is optically coupled with the output terminal at a point at which an optical signal having a Q-bar (270°) component focuses on the output terminal.

8. The optical phase diversity receiver according to claim 6,
    wherein the fifth output waveguide is optically coupled with the output terminal at a point at which an optical signal having an I (0°) component focuses on the output terminal, wherein the sixth output waveguide is optically coupled with the output terminal at a point at which an optical signal having an I-bar (180°) component focuses on the output terminal, wherein the seventh output waveguide is optically coupled with the output terminal at a point at which an optical signal having a Q (90°) component focuses on the output terminal, and wherein the eighth output waveguide is optically coupled with the output terminal at a point at which an optical signal having a Q-bar (270°) component focuses on the output terminal.

9. The optical phase diversity receiver according to claim 4, further comprising:
an optical detector optically coupled with the first to eighth output waveguides at a side opposite to the output terminal and configured to receive an optical signal and convert the received optical signal into an electrical signal.

10. The optical phase diversity receiver according to claim 1,
wherein the plurality of grating surfaces are configured such that positions or reflection angles of every predetermined number of the grating surfaces are chirped in an identical manner.

11. The optical phase diversity receiver according to claim 10,
wherein the predetermined number of grating surfaces are defined as one period,
wherein the plurality of grating surfaces include a first grating surface and a second grating surface that are repeatedly arranged each period, and
wherein the first grating surface and the second grating surface differ in length of a path of an optical signal based on a center wavelength.

12. The optical phase diversity receiver according to claim 11,
wherein a length of a path of an optical signal formed by the first grating surface is shorter or longer than a length of a path of an optical signal formed by the second grating surface by a predetermined multiple based on the center wavelength.

13. The optical phase diversity receiver according to claim 12,
wherein the predetermined multiple includes a fraction.

14. The optical phase diversity receiver according to claim 10,
wherein the predetermined number of grating surfaces are defined as one period,
wherein the plurality of grating surfaces include a first grating surface and a second grating surface that are repeatedly arranged each period, and
wherein a reflection angle of the first grating surface and a reflection angle of the second grating surface are determined such that a diffraction order depending on the reflection angle of the first grating surface and a diffraction order depending on the reflection angle of the second grating surface differ from each other.

15. The optical phase diversity receiver according to claim 14,
wherein the diffraction order depending on the reflection angle of the first grating surface and the diffraction order depending on the reflection angle of the second grating surface have an integer multiple difference therebetween.

* * * * *